United States Patent Office 3,588,999
Patented June 29, 1971

3,588,999
METHOD OF PRODUCING WOUND-FOIL SOLID CAPACITOR
Hajime Sasaki, Yokohama-shi, and Takeshi Namikata and Yuji Ichikawa, Kawasaki-shi, Japan, assignors to Fujitsu Limited, Kawasaki, Japan
Continuation-in-part of abandoned application Ser. No. 548,008, May 5, 1966. This application Jan. 3, 1969, Ser. No. 837,962
Claims priority, application Japan, May 7, 1965, 40/26,642
Int. Cl. H01g *13/00*
U.S. Cl. 29—570                                                                10 Claims

ABSTRACT OF THE DISCLOSURE

Method of producing wound-foil solid capacitor includes placing a cathode foil and an anode foil formed with an oxide film of the anode material one upon the other, placing a layer of cellulose derivative separator material between the cathode and anode foils, winding the sandwich of the foils and separator layer into a coil and heating the wound coil to temperatures at which the cellulose derivative separator material is vaporized and a manganous salt impregnating the cathode foil is pyrolized and converted to manganese dioxide; and wound coil of solid electrolytic capacitor produced by the method.

---

This is a continuation-in-part of application Ser. No. 548,008, filed May 5, 1966, and now abandoned.

Our invention relates to solid capacitors or condensers of the wound-foil type, and method of producing the same.

Solid capacitors have been produced heretofore, provided with an anode suitably formed of layers of metal such as aluminum, titanium, tantalum, niobium or zirconium which have a desirable film-forming characteristic. The metal layers are coated in turn with a layer of manganese dioxide which is reformed several times to eliminate any cracks or breaks therein resulting from the preceding forming steps. The solid capacitor ultimately produced has electrical characteristics superior to those of the conventional electrolytic capacitor or condenser and is also considerably smaller in size for the same capacity. Of particular advantage is the use of tantalum since the anode element can be formed of a sintered body of that metal. Since it is difficult, however, to provide an anode element of aluminum or titanium in sintered form, anodes and cathodes of these metals are made in the shape of thin foils which are wound to produce capacitors of relatively small size and large capacity. The latter type of capacitor is generally produced by winding the formed anode foil only, coating the foil with a layer of manganese dioxide by means of pyrolyzing manganese nitrate and by repeating the formation of the manganese dioxide layer to repair any cracks or fissures previously occurring therein, surrounding the manganese dioxide-coated anode with a layer of graphite, and enclosing the entire package of anode foil, manganese dioxide and graphite in a metal cathode jacket. Another similar type of known capacitor is provided with heatproof, insulating and porous separator means such as glass fiber, for example which is inserted between a formed anode foil and cathode foil and is wound therewith to form a compact capacitor.

All of the foregoing known capacitors suffer from deficiencies in their electrical characteristics, and particularly in power loss and variation in capacitance with changing frequencies. These deficiencies are caused by the fact that the equivalent series resistance of the capacitor, determined by the semiconductor manganese dioxide layer and the engagement or contact thereof with the cathode, is relatively large.

It is also known that a solid capacitor of the wound-foil type requires a separator or spacer between anode and cathode to prevent the possible occurrence of a short circuit if they should come into engagement with one another. However, if conventional glass fiber cloth or the like is used as the separator, it remains in the capacitor even when the capacitor is subjected to temperatures of 350° to 450° C. in order to deposit the manganese dioxide on the metal anode foil. The completed capacitor containing the glass fiber separator consequently has electrical characteristics which are negatively affected by the presence of the separator material.

Conventional capacitors are often produced by placing a cathode foil, previously coated with manganese dioxide, and an anode foil, formed with an oxide film, on top of one another, and winding the coated foils together. This method of production has an annoying disadvantage in that the manganese dioxide applied to the cathode foil comes off and soils the hands of the technician or other operator during the winding operation.

It is accordingly an object of our invention to provide solid capacitor of the wound-foil type and method of producing the same which avoids the aforementioned difficulties of the heretofore known capacitors of this general type and of the heretofore known methods of producing the same.

It is more particularly an object of our invention to provide solid capacitors of the wound-foil type and method of producing the same which will ensure the availability of a relatively high formation voltage by increasing the resistance between anode and cathode and to provide a capacitor of this type which will have a relatively low equivalent series resistance.

A further object of our invention is to provide the method of producing such capacitors with a capacitor winding operation of improved efficiency.

Another object of our invention is to expedite the precipitation of manganese dioxide in the method of producing such capacitors.

With the foregoing and other objects in view we provide method for producing solid capacitors of the wound-foil type in accordance with the invention wherein the separator material serves to separate anode foil from cathode foil only during the time the foils are wound and during the first forming operation serving to repair any cracks or fissures so as thereby to increase the voltage capacity of the capacitor for reforming. The separator material, however, does not remain in the capacitor after the manganese dioxide is pecipitated so that the capacitor consequently has a relatively low equivalent series resistance.

In accordance with another feature of the method of our invention, a fine powder of manganese dioxide is previously suspended in the separator. This advantageously facilitates the precipitation of manganese dioxide from the pyrolysis of manganese nitrate with which the anode is impregnated, because the fine powder of manganese dioxide suspended in the separator remains in the center of the manganese nitrate after the separator material is vaporized and completely vanishes.

In accordance with yet other more specific features of our invention, the separator material consists of a cellulose derivative such as nitrocellulose, ethyl cellulose and methyl cellulose which are vaporized under the conditions at which the method of the invention are carried out, i.e. at least at a temperature of about 400° C. when being heated in air and leave scarcely any residue such as tar and the like. Nitrocellulose is an especially satisfactory material for the separator since it is easily vaporized and vanishes as it ignites at a temperature of about 180° C., the film coating property thereof being quite favorable, and the use thereof ensuring that the manganese dioxide precipitated by the pyrolysis of manganese nitrate is less inclined to be reduced to the lower oxide, i.e. the monoxide of manganese. Increase in the equivalent series resistance of the capacitor due to the semiconductive layer of manganese dioxide is thus avoided, power loss is accordingly minimized, and a highly superior frequency characteristic is made available.

As aforementioned, the separator material of our invention is the equivalent of the known glass fiber cloth but only during the time the capacitor foils are being wound and during the first forming operation in which cracks or fissures are repaired, after which the separator material of our invention is removed without leaving a residue. Removal of the separator material is effected, in accordance with further specific features of our invention, either, as aforementioned, during the pyrolysis of the manganese nitrate at a temperature of about 400° C. or preceding the pyrolysis treatment.

In the following table there are given various kinds of lacquer coating films serving as fugitive separators of the anode and cathode foils of a capacitor as well as various observable characteristics thereof when pyrolyzed. As seen in the table, nitrocellulose is superior to all the other lacquers in all respects except with regard to adhesive tension.

description when read in connection with the accompanying drawings, in which

Figure 1:
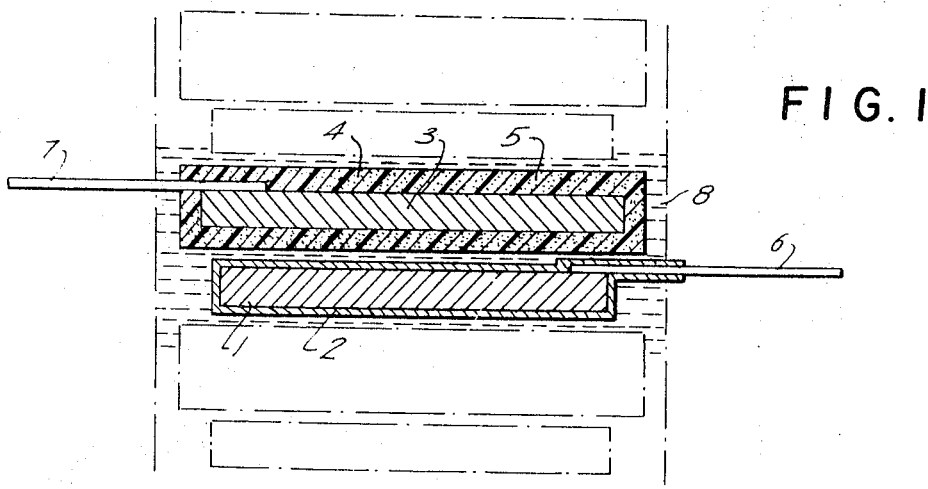
FIG. 1 is a sectional view of a wound-foil type of solid capacitor constructed in accordance with the invention, before manganese dioxide is precipitated thereon by pyrolysis of manganese nitrate.
Figure 2:
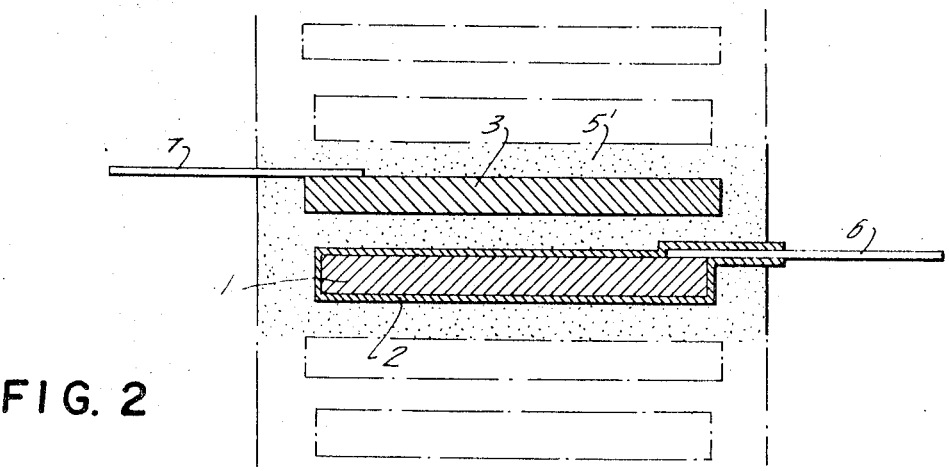
FIG. 2 is substantially the same view as that of FIG. 1 but after manganese dioxide has been precipitated by pyrolysis of manganese nitrate.

Referring now to the drawings and first to FIGS. 1 and 2 thereof, there is shown a film-forming metal foil 1, of aluminum or titanium, for example, as anode having a rough surface formed with an oxide film 2 of the metal anode. A lacquer film 4 having a cellulose derivative, such

TABLE

| Main constituent of lacquer | Adhesion tension of coating film to coarse surface of Al (kg./cm.²) | Ignition point (° C.) | Amount of residue produced when lacquer coating film is heated for 10 min. at 400° C. (percent) | Specific resistance of residue produced when coating film produced by suspending $MnO_2$, 35 g. in lacquer of viscosity 100 cp., 100 cc. is heated for 5 minutes at 350° C. (Ω-cm.) |
|---|---|---|---|---|
| Nitrocellulose (RS 20) | 1.5 | 170~200 | <0.05 | $9 \times 10^3$ |
| Ethylcellulose | 2.9 | 380~420 | 1~3 | $8 \times 10^7$ |
| Acetylcellulose | 3.6 | 500~520 | 9~10 | $1 \times 10^8$ |
| Acetylcellulose butylate | 3.4 | | 6~7 | $>10^8$ |
| Styrene butadien copolymer | 4.6 | 500~520 | 9~10 | $>10^8$ |
| Polyvinyl alcohol | 5.0 | 540~550 | 10 | $>10^8$ |

Further in accordance with our invention, the method includes either inserting between anode and cathode foil a separate film consisting of cellulose derivative with or without a suspension therein of fine manganese dioxide powder and then winding the sandwich of anode and cathode foil with the intermediate separator of cellulose derivative, or painting on the cathode foil a cellulose lacquer dissolved in a suitable organic solvent and including therein a suspension of fine manganese dioxide powder and drying the same so as to form a film coating adhering to the surface of the cathode. The second of the just-mentioned variations of the method of the invention offers a greater efficiency in manufacturing the capacitors since it is necesary then only to wind the anode and cathode foils.

In accordance with still another feature of our invention, the separator is formed by painting the lacquer coating film either directly on the cathode foil or on a layer of manganese dioxide precipitated on the cathode foil by pyrolysis of manganese nitrate which had previously been applied to the cathode foil.

Other features which are considered as characteristic for the invention are set forth in the appended claims.

Although the invention is illustrated and described herein as solid capacitor of the wound-foil type and method of producing the same, it is nevertheless not intended to be limited to the details shown, since various modifications and structural changes may be made herein without departing from the spirit of the invention and within the scope and range of equivalents of the claims.

The construction and method of operation of the invention, however, together with additional objects and advantages thereof will be best understood from the following as nitrocellulose for example, as main constituent, and having an ignition point under about 400° C., is painted or applied on a cathode foil 3. A fine powder of manganese dioxide 5 is suspended uniformly in the lacquer film coating 4. A lead wire 6 is connected to the anode foil 1 and a lead wire 7 is connected to the cathode foil 3 by welding, brazing or soldering prior to applying the mthod of the instant invention.

In accordance with the method of our invention, the anode foil 1 and the cathode foil 3 are placed upon one another and are wound. Any cracks or fissures appearing in the formed metal oxide film 2 of the anode 1 during the winding operation are repaired by repeat forming, the foils are impregnated with or immersed in manganese nitrate 8, and manganese dioxide 4 is precipitated by pyrolysis of the manganese nitrate at a temperature ranging between 350° to 450° C. with the concurrent vaporization of the lacquer film coating of cellulose derivative by pyrolysis, and the manganese dioxide layer is then reformed and further precipitation thereof is effected to remove any cracks that may have formed during the first precipitation. After carrying out the foregoing steps of the invention, a capacitor as illustrated in FIG. 2 is then produced. As shown in FIG. 2, the lacquer film 4, acting as separator for the anode and cathode foils, has vanished completely and manganese dioxide 5' precipitated by the pyrolysis of manganese nitrate has taken its place.

Figure 4:
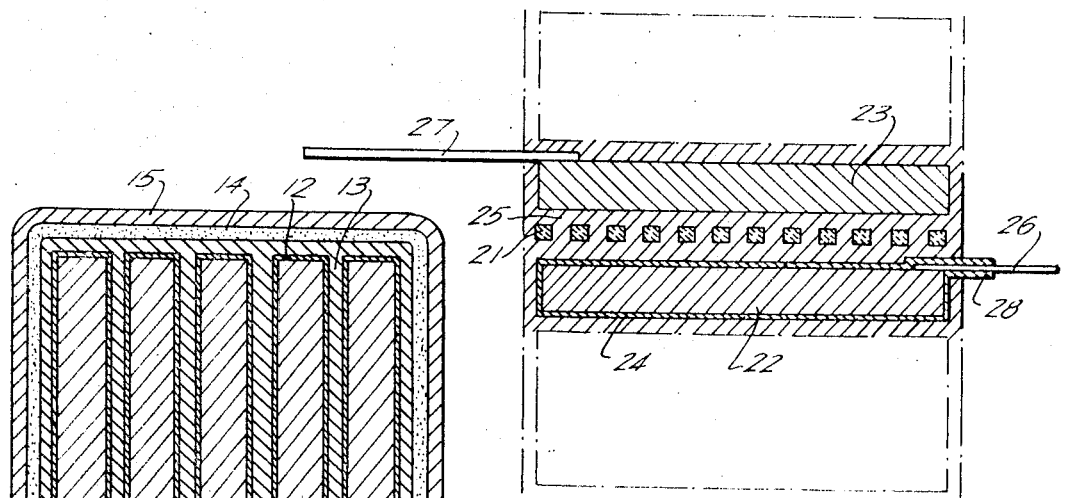
FIG. 4 is a sectional view of an embodiment of a prior art solid condenser having glass fiber as an insulator and spacer between the anode and cathode foils.
Figure 3:
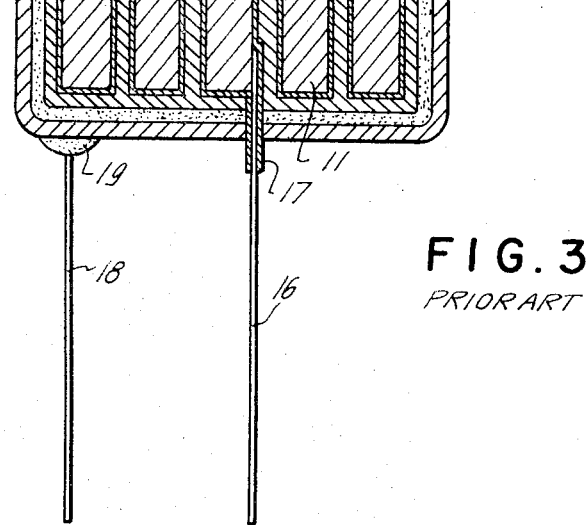
FIG. 3 is a sectional view of an embodiment of a prior art solid capacitor having only a wound anode foil.

For illustrative and comparative purposes, FIGS. 3 and 4 show capacitors constructed in accordance with methods of the prior art described in the introduction to this specification. Thus, FIG. 3 shows an embodiment of a prior art solid condenser wherein only the anode foil 11 is wound.

A semiconductor layer 13 of manganese dioxide, for example, is provided on all of the surfaces of the wound anode foil 11. A graphite layer 14 is in turn provided on the semiconductor layer 13 and surrounding the wound anode foil 11. A cathode in the form of a metal jacket or coating 15 surrounds the entire package. An electrode lead 16 is affixed to the anode foil 11 and passes through an extending portion 17 of the oxidized metal film 12. An electrode lead 18 is affixed to the metal coat 15 by solder 19, for example.

FIG. 4 shows an embodiment of a prior art solid condenser wherein glass fiber 21 is employed for separating and insulating the anode foil 22 and cathode foil 23 from each other. An oxide film 24 is formed on the anode foil 22. A semiconductor layer 25 is provided with the glass fiber 21 between the anode and cathode foils 22 and 23 and also surrounding the wound package of the foils 22, 23 and the glass fiber 21 therebetween. An electrode 26 is suitably affixed to the anode foil 22 through an extending portion 28 of the oxide film 24, and an electrode lead 27 is also suitably affixed to the cathode foil 23.

Figure 5:
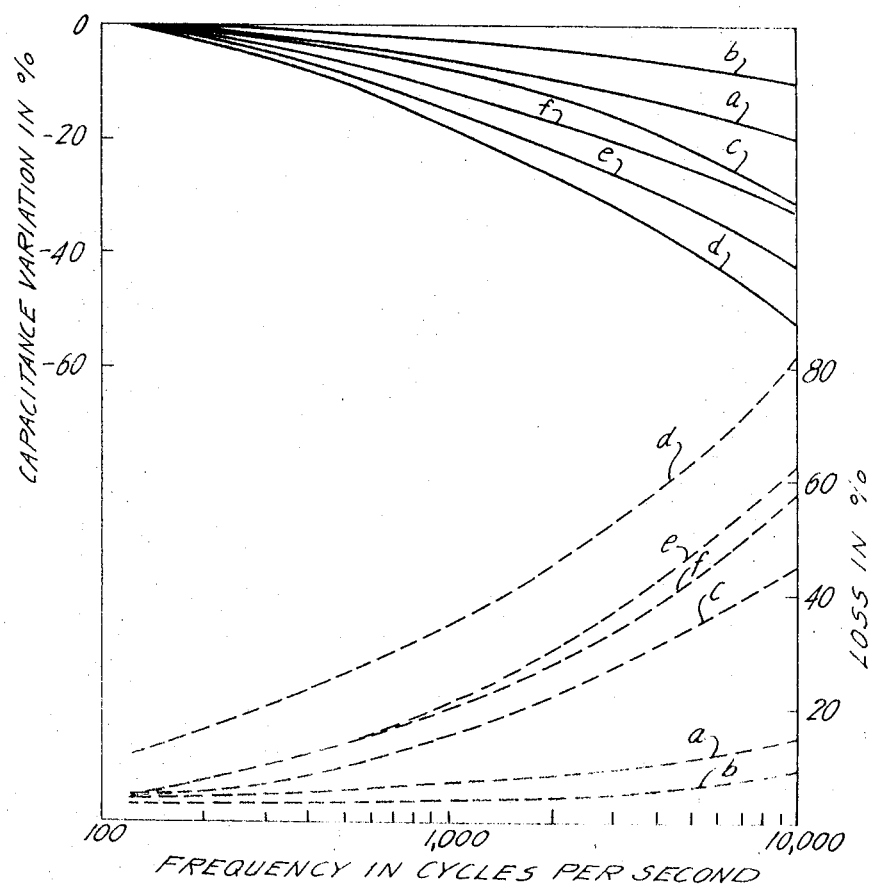
FIG. 5 is a plot of capacitance variation with respect to frequency of the embodiments of FIGS. 1 to 4.

With reference to the graph of FIG. 5, the characteristics of several embodiments of capacitors produced by various examples of the method of the invention will be compared with those of one another as well as with those of the embodiments of the prior art shown in FIGS. 3 and 4.

Thus, the curves $a$ in FIG. 5 show the electrostatic capacity (solid line) and power loss (dotted line) with respect to frequency of a capacitor produced by dissolving nitrocellulose (RS-20) as the cellulose derivative in a solvent consisting of a mixture of ether, acetone and methanol and adjusting the viscosity of the resulting lacquer to substantially 100 cp., applying the lacquer onto the cathode foil to a thickness of about 50$\mu$ and drying it so as to thereby form a separator, placing the cathode foil on the anode foil and winding both foils together, forming and repairing any cracks arising in the formed film of lacquer during the winding step, impregnating the wound foils with manganese nitrate and pyrolizing the latter by heating it for 5 minutes at a temperature of 350° C., reforming and recoating the manganese dioxide several times to remove any cracks originally produced therein, and encasing the wound foils and manganese dioxide coatings.

Curves $b$ show the characteristic of a capacitor having a separator formed by applying to the surface of the cathode foil 100 cc. of nitrocellulose (RS-20) lacquer of 100 cp. viscosity including a uniform suspension therein of 20 g. fine manganese dioxide powder, and then drying the suspension. Curves $c$ and $d$ show characteristics of capacitors produced by a method in accordance with the invention wherein ethyl cellulose and acetylcellulose are dissolved respectively in organic solvents to produce lacquers having a viscosity of 100 cp., suspending 20 g. of fine manganese dioxide powder in each 100 cc. of the lacquers, applying the suspensions on the cathode foils and drying them, and winding the entire package.

Curves $e$ show the characteristic electrostatic capacity and power loss relative to frequency of the conventional solid capacitor of the wound-foil type shown in FIG. 3, and curves $f$ show the corresponding characteristics of the conventional capacitor having glass fiber cloths or webs as separator as shown in FIG. 4. The capacitors of curves $a$ through $e$ have a capacitance of 5 $\mu$f. and a voltage rating of 25 v. while the capacitor of the curves $f$ has a capacitance and voltage rating respectively of 16 $\mu$f. and 10 v.

It is believed to be clear from FIG. 5 that solid capacitors of the wound-foil type employing nitrocellulose lacquer as separator have decidedly superior frequency characteristics. Ethylcellulose and acetylcellulose, though inferior to nitrocellulose in this regard, are nevertheless superior to the other materials shown in the table.

An improvement in the characteristics of the embodiment of FIGS. 1 and 2 is manifested by modifying the method of the invention so as to decompose and eliminate the separator material 4 prior to carrying out the pyrolysis of the manganese nitrate 8. Due to this modified method, the manganese nitrate uniformly coats the cathode foil 3 after the separator material 4 has been removed whereas in the method wherein the elimination of the separator material occurs simultaneously with the pyrolysis of the manganese nitrate, the latter cannot adhere uniformly to the cathode due to interference resulting from the formation of decomposition gas as the separator material is decomposed causing nonuniform deposition of manganese dioxide on the cathode foil. Thus, as shown in FIG. 6, by employing this modified method wherein the separating material is removed before pyrolyzing the manganese nitrate, the capacitor produced has less loss deviation than one produced by the method wherein the elimination of the separating material is effected simultaneously with the pyrolysis of the manganese nitrate.

In this modified method, nitrocellulose RS-20 is again employed as the cellulose derivative, and is dissolved in an organic solvent consisting of a mixture of ethyl acetate and ethanol. A fine powder of manganese dioxide or $Mn_2O_3$ is added to the organic solvent and is well mixed therein. The resulting lacquer is then applied to a thickness of about 20$\mu$ onto an aluminum foil serving as the capacitor cathode, and is dried. The coated cathode foil is thereafter placed on an anodically oxidized aluminum foil of high purity having a coarse surface, which serves as the capacitor anode, and both foils are wound into a capacitor package. Subsequently, and prior to impregnating the package with manganese nitrate, it is heated at a rate of 15° C. per minute up to a temperature of 250° C. which is then maintained for a period of 1 to 5 minutes until the lacquer coating is decomposed and eliminated leaving a layer of manganese dioxide on the cathode foil. After then impregnating the foils with manganese nitrate, the latter is pyrolyzed to precipitate manganese dioxide at a temperature between 350° to 450° C., the manganese dioxide layer being then reformed to remove any cracks occurring therein.

Figure 6:
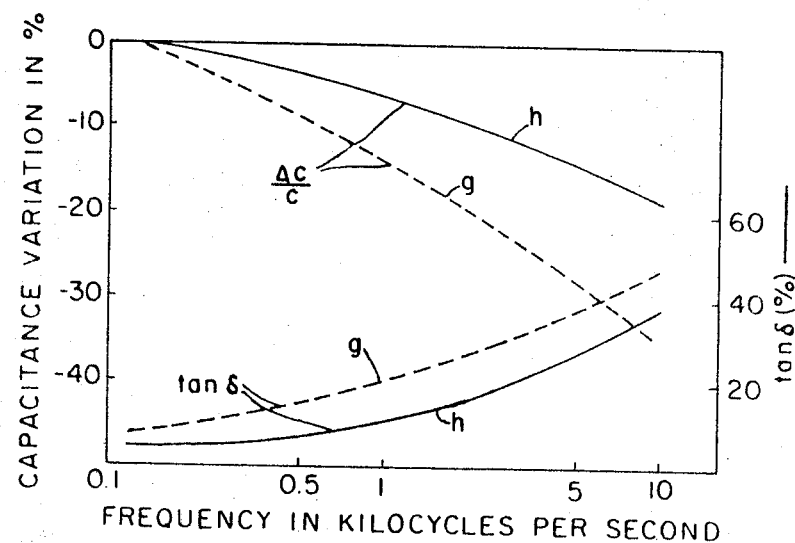
FIG. 6 is a plot corresponding to that of FIG. 5 for a somewhat modified form of the embodiment of the invention shown in FIGS. 1 and 2.

In the plot diagram of FIG. 6, the characteristic curves $g$ of the capacitor formed by the method wherein the elimination of the separating material and the pyrolysis of the manganese nitrate are effected simultaneously are shown in broken lines for the sake of comparison with the solid line characteristic curves $h$ of a capacitor formed by the just-described modified method of the invention. It is noteworthy that a capacitor having the same dimensions and utilizing the same materials, when produced in accordance with this modified method have an electrostatic capacity of 15 $\mu$f. and a rated voltage of 25 v. whereas capacitors made by the method wherein separating-material removal and manganese nitrate pyrolysis are simultaneous have an electrostatic capacity of only 10 $\mu$f. with a rated voltage of 25 v.

A further variation of the method of the invention and a resulting modification of the capacitor of the invention is to anodically oxidize the cathode as well as the anode and further apply the various steps of the method of the invention to produce a non-polar solid condenser of the wound-foil type in accordance with the invention.

We claim:
1. Method of producing wound-foil solid capacitor which comprises placing a cathode foil and an anode foil formed with an oxide film of the anode material one upon the other, placing a layer of cellulose derivative separator material between the cathode and anode foils, winding the sandwich of the foils and separator layer into a coil and heating the wound coil to temperatures at which the cellulose derivative separator material is vaporized and a manganous salt impregnating the cathode foil is pyrolized and converted to manganese dioxide.

2. Method according to claim 1 which includes impregnating the the cathode foil with manganese salt, pyrolytically convertible to manganese dioxide, after the wound coil is heated to a temperature at which the cellulose derivative separator material is vaporized, and then heating the coil to the pyrolytic conversion temperature of the manganous salt to convert the salt to manganese dioxide and to vaporize the cellulose separator.

3. Method according to claim 1 which includes, prior to vaporizing the cellulose derivative separator material, impregnating the foils and the layer of separator material with manganous salt pyrolytically convertible to manganese dioxide, and thereafter heating the covered coil to the pyrolytic conversion temperature of the manganous salt to vaporize the cellulose separator material and to convert the salt to manganese dioxide.

4. Method according to claim 1, wherein a fine manganese dioxide powder is substantially uniformly suspended in said cellulose derivative.

5. Method according to claim 1, wherein the cellulose derivative is inserted in the form of a separate film between the foils.

6. Method according to claim 1, wherein the cellulose derivative is applied to the cathode foil as a main constituent of a lacquer dissolved in an organic solvent.

7. Method according to claim 1, wherein the oxide of the anode metal is reformed to repair cracks produced therein by winding the foils.

8. Method according to claim 1, wherein the oxide film of the anode material is repeatedly reformed to remove any cracks formed therein when the manganese dioxide layer is formed.

9. Method according to claim 1, wherein said cellulose derivative is selected from the group consisting of nitrocellulose, ethylcellulose and methylcellulose.

10. Method according to claim 1, wherein the manganese nitrate is pyrolyzed at a temperature between 350° and 450° C.

References Cited

UNITED STATES PATENTS

| | | | |
|---|---|---|---|
| 3,028,447 | 4/1962 | Flashen et al. | 317—230 |
| 3,066,247 | 11/1962 | Robinson | 317—230 |
| 3,311,797 | 3/1967 | Siddall | 317—230 |
| 3,371,295 | 2/1968 | Bourgault et al. | 333—70 |
| 3,443,164 | 5/1969 | Hazzard | 317—230 |

JAMES D. KALLAM, Primary Examiner

U.S. Cl. X.R.

317—230